United States Patent [19]
Carpenter et al.

[11] 3,916,971

[45] Nov. 4, 1975

[54] ADAPTOR FOR TIRE CHANGING STANDS

[75] Inventors: David M. Carpenter, Nashville; Stephen F. Howard, Antioch, both of Tenn.

[73] Assignee: The Coats Company, Inc., LaVergne, Tenn.

[22] Filed: June 17, 1974

[21] Appl. No.: 480,317

[52] U.S. Cl............................. 157/1.24; 144/288 A
[51] Int. Cl.²........................................ B60C 25/06
[58] Field of Search................ 157/1.24; 144/288 A

[56] References Cited
UNITED STATES PATENTS

| | | | |
|---|---|---|---|
| 2,661,793 | 12/1953 | Rockwell | 157/1.24 |
| 3,474,840 | 10/1969 | Scott | 144/288 A |
| 3,521,494 | 7/1970 | Carrigan | 144/288 A |
| 3,583,238 | 6/1971 | Haynes | 144/288 A |
| 3,685,565 | 8/1972 | Sorenson et al. | 157/1.24 |

*Primary Examiner*—Al Lawrence Smith
*Assistant Examiner*—Harold P. Smith, Jr.
*Attorney, Agent, or Firm*—Wegner, Stellman, McCord, Wiles & Wood

[57] ABSTRACT

An adaptor for use with a tire changing stand to permit the latter to be used in the changing of tires mounted on rims of a decorative type without marring the same. The adaptor includes a plate having a plurality of bores for receiving lugs which, in turn, may be engaged in the old holes of the rim. A unique configuration of the bores on the plate allows the adaptor to be used with a wide variety of rim sizes.

5 Claims, 3 Drawing Figures

U.S. Patent  Nov. 4, 1975  3,916,971
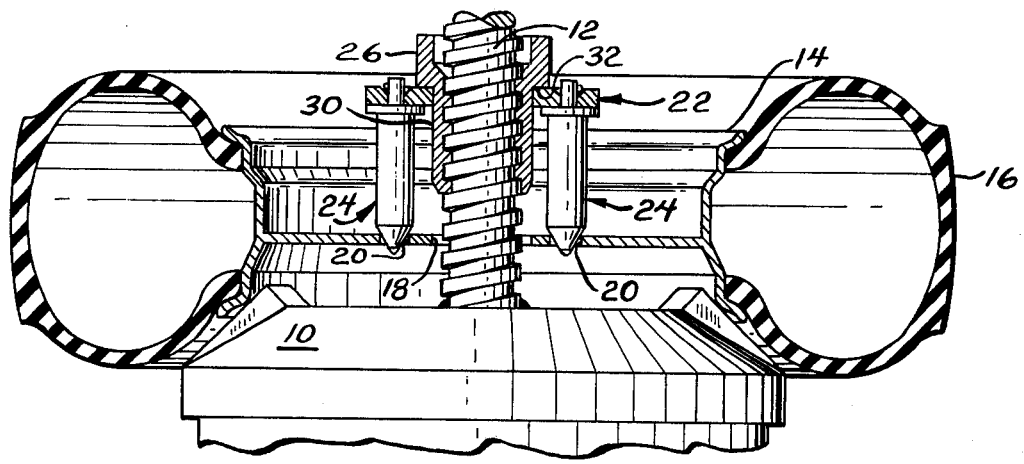
Fig. 1
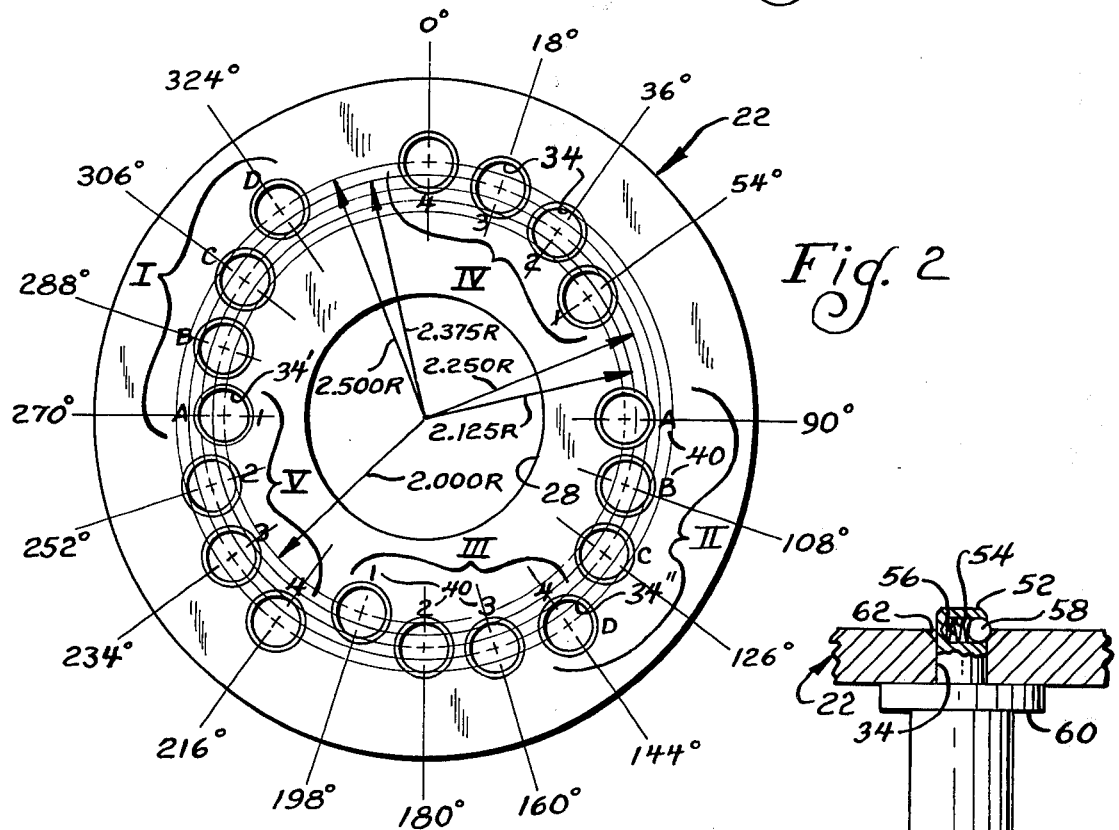
Fig. 2
Fig. 3

ADAPTOR FOR TIRE CHANGING STANDS

BACKGROUND OF THE INVENTION

This invention relates to tire changing apparatus and, more particularly, an adaptor for use with tire changing stands. The most pertinent prior art presently known to the applicant includes U.S. Pat. Nos. 3,685,565 to Sorenson et al.; and 3,474,840 to Scott.

Many tire changing stands in use today include a center post for impaling a wheel rim. In general, the post is threaded and a so-called "hold-down cone" may be received on the same to bear against a wheel rim and firmly hold the latter in place on the tire changing stand so that various tire changing operations may be performed. A typical stand embodying the above structure is that shown in U.S. Pat. No. 3,555,800 to Strang et al.

The increased use of special or decorative wheel rims, such as those made of magnesium, aluminum, or employing non-metallic material for decorative purposes, have created problems with respect to the tire servicing function customarily performed on such stands for the reason that such rims are easily marred, thereby ruining their decorative appearance. For example, the hold-down cone may gouge or otherwise mar the surface of the rim at the point at which it contacts the same to secure the rim to the tire changing stand.

As a result, efforts have been made to provide adaptors for use with such tire changing stands to enable the decorative rims to be received on the stand and held thereon so that tire servicing functions may be performed without marring the rims. The above identified Scott and Sorenson et al patents are illustrative of adaptors suitable for this purpose.

SUMMARY OF THE INVENTION

It is the principal object of the invention to provide a new and improved adaptor for use with tire changing stands. More specifically, it is an object of the invention to provide such an adaptor which is economical in terms of fabrication costs; is simple in terms of construction; and may be easily used by inexperienced personnel.

The exemplary embodiment achieves the foregoing objects in a construction including a plate provided with a plurality of bores for selectively receiving lugs which may engage a rim in the bolt holes thereof. The bores are arranged in a plurality of groups with the bores in each wheel group being on differing radii with respect to a predetermined point on the plate.

Groups of the bores are arranged in sets of groups and corresponding bores in each group of a set are at the same radiii with respect to the point. The angular spacing between the groups of one set differs from the angular spacing between the groups of each other set and is equal to $$\frac{N(360°)}{(n)}$$

where $N$ is an integer and $n$ is an integer of $2N$ or greater.

At least some of the bores are common to two of the groups.

In a highly preferred embodiment, the angular spacing between the groups of one set is equal to 180°, while the angular spacing between the groups of another of the sets is equal to 144°. In this case, the groups of the first mentioned set may receive lugs for engaging the bolt holes in rims having multiples of four bolt holes, while the second mentioned set of groups may receive lugs for engaging the bolt holes in rims having multiples of five bolt holes. Because the bolt holes in each group are differing distances from a predetermined point, appropriate location of a lug in a particular one of the bores in a group allows the adaptor to be used with rims of differing bolt circle diameters.

A preferred embodiment of the invention includes a further group of bores to cooperate with the last mentioned set of bores. This additional group of bores is spaced from one of the groups of the last mentioned set by 72°.

In the preferred embodiment, the bores are defined by apertures extending through the plate and the lugs include a shaft section for receipt in the bore which is provided with a spring detent for releasably retaining the lug in a given one of the bores. Indicia is also provided to identify corresponding bores in the groups of each set so that the adaptor may be easily used.

Other objects and advantages will become apparent from the following specification taken in connection with the accompanying drawings.

DESCRIPTION OF THE DRAWINGS

FIG. 1 is a side elevation of a tire changing stand provided with an adaptor made according to the invention with parts shown in section for clarity;

FIG. 2 is a scaled, plan view of the adaptor; and

FIG. 3 is a fragmentary illustration of an adaptor plate and rim engaging lug.

DESCRIPTION OF THE PREFERRED EMBODIMENT

As illustrated in FIG. 1, an adaptor is intended to be used with a tire changing stand having a table 10 with an upstanding, threaded center post 12. A rim 14, mounting a tire 16, is impaled through a central opening 18 in the rim on the post 12 so that the tire 16 may be serviced as desired.

The rim 14 also includes a plurality of bolt receiving openings 20 by which the same may be firmly secured to the hub of a car. As is well-known, the location of the bolt receiving openings 20 with respect to the central opening 18, in terms of angular position with respect to each other as well as radial distance from the center of the opening 18, vary substantially. Frequently, however, there will be four or five such openings 20 equally angularly spaced about the central opening and the adaptor of the present invention is directed towards rims having such configurations.

An adaptor made according to the invention is seen to include a plate, generally designated 22, removably mounting a plurality of lugs, each generally designated 24, which may be partially received in the openings 20 within the rim 14. The plate 22 is secured to the stand by means of an internally threaded clamping nut 26. As seen in both FIGS. 1 and 2, the plate 22 includes a central opening 28 through which a reduced diameter portion 30 of the nut 26 may extend. The reduced diameter portion 30 terminates in an outwardly extending shoulder 32 which may engage the upper surface of the plate 22 to apply a clamping force to the latter to drive the lugs 24 into firm engagement with the periphery of the bolt receiving openings 20 in the rim 14 to firmly hold the latter in place on the table 10.

Turning now to FIG. 2, the plate 22 will be described in greater detail. In this respect, it is again to be observed that FIG. 2 is a scale drawing and the dimensions and angular relationships thereon specified are those employed in the best mode of the invention as presently contemplated by applicant.

In addition to the central opening 28 in the plate 22, the same includes a plurality of bores 34 which, in the preferred embodiment, extend through the plate 22, as illustrated in FIG. 3. In the preferred embodiment of the invention, there are five groups of bores 34, each group consisting of four bores. A first such group is designated by the numeral I, while a second such group is designated by the numeral II. Groups I and II, for purposes to be seen, constitute a set for use with rims having two (or multiples thereof) or four bolt receiving openings 20.

Groups designated by numerals III and IV, constitute a second set of groups which, as will be seen, are employed in the servicing of rims having five (or a multiple thereof) of the bolt receiving openings 20.

A fifth group designated by numeral V, is also employed in connection with the set of groups defined by groups III and IV for the same purpose.

Moreover, certain of the bores 34 are common to two groups. For example, a bore designated 34' is common to both groups I and V, while a bore designated 34'' is common to groups II and III. The sharing of bores by two groups minimizes fabrication expense in terms of minimizing the number of bores 34 that must be provided to permit the adaptor to be used with a wide variety of rims.

The bores 34 in each group are differing distances from the center of the plate 22 which is coextensive with the center of the central opening 28. Also, there are corresponding bores in each of the groups in a set in terms of their distance from the center. Thus, the radially outermost bore 34 in each of groups I and II are the same distance from the center of the plate 22.

The upper surface of the plate 22 is also provided with indicia 40 in close proximity to each of the bores 34. The indicia is chosen to designate the corresponding bores in the groups of a set. In the case of groups I and II, alphabetical letters are employed for this purpose, while in the case of groups III – V, inclusive, numerical indicia is employed for this purpose. Thus, by observing the indicia 40, one can immediately tell which groups are in a set, and which bores in each group are located the same distance from the center of the plate 22.

Turning now to FIG. 3, the construction of the lug 24 will be described. Each lug 24 includes a centrally located, generally cylindrical portion 42 terminating at one end in a frusto-conical formation 44. Formation 44, at its end, is provided with an internal bore 46 for receipt of a stub shaft 48 on the face of a conical plastic piece 50. The conical plastic piece 50 is held secured by any suitable means such as an adhesive or a force fit.

The end of the cylindrical portion 42 opposite the frusto-conical formation 44 terminates in a reduced diameter shaft 52, the diameter of which is just slightly less than the diameter of the bores 34. The shaft end 52 is somewhat longer than the thickness of the plate 22 and includes a transverse bore 54 which receives a spring 56 and a ball 58 in such a way that the latter is urged outwardly. By any suitable means, the end of the bore 54 emerging from the shaft end 52 is reduced in diameter after the spring 56 and ball 58 are received therein to capture the same.

Intermediate the shaft end 52 and the cylindrical portion 44 is a radially outwardly extending collar 60 which is adapted to abut against the underside of the plate 22 to provide a broad base of abutment against the plate 22 thereby precluding the lug 24 from skewing appreciably with respect to the axis of the bore 44.

Finally, the upper end of each bore 44 is provided with a slight chamfer 62. As will be recognized, the spring loaded ball 58 provides a releasable retaining means for the lug 24 in any given one of the bores 34 while the chamfer 62 acts as a cam surface to cam the ball 58 inwardly when the lug 24 is pulled away from the plate 22 to establish easy releasability in the connection.

As mentioned previously, the exemplary embodiment described herein is intended for use with decorative rims of varying sizes and having four or five bolt receiving openings 20 therein. However, it should be appreciated that the principles herein described can be employed for other configurations. In general, the angular spacing between the groups of bores in a set and the corresponding bores therein as identified by identical indicia 40, is equal to the relationship $$\frac{N(360°)}{(n)}$$

where $N$ is an integer and $n$ is an integer of $2N$ or greater.

Generally, it is desirable to maintain the ratio of $N:n$ as nearly as possible to the ratio of 1:2 so that the groups of the set are most evenly distributed about the center of the plate 22 to insure firm securement of a rim to a tire changing stand.

The adaptor may be used as follows. First, a rim is placed on the table top of a tire changing stand over the center post thereof and if the table top is provided with a positioning pin, it should be placed in one of the bolt receiving openings in the rim.

The lugs 24 are then introduced into appropriate bores 34 in the plate 22. Where the rim has a five hole pattern, three lugs are introduced into the numbered positions bearing the identical numbers in groups III, IV, and V, while if the rim has a four hole pattern, two lugs are employed and are introduced into the correspondingly lettered bores in groups I and II.

The adaptor assembly is then placed over the rim with the lugs 24 extending into bolt receiving openings of the rim. Of course, the adaptor must be positioned so that the lug does not enter the hole occupied by the positioning pin, if one is employed.

The nut structure 26 is then employed to tighten the rim and adaptor to a firmly secured position on a table top. Thereafter, tires may be mounted and/or demounted in the usual fashion.

We claim:

1. An adaptor for use with tire changing machines comprising, a plate;

means on said plate whereby said plate may be secured to a tire changing stand;

a plurality of at least four groups of plural bores in said plate, the bores within each group being at differing radii with respect to a predetermined point on said plate and each bore of a group being at the same radii as a corresponding bore in at least one of the other groups, sets of said groups being located at different angular positions about said point with the angular spacing between the corresponding bores within the groups of each set being different from the angular spacing between the corresponding bores within the groups of each other set, at least some of said bores being common to two of said groups; and a plurality of at least two lugs removably received in different ones of said bores.

2. An adaptor for use with tire changing machines comprising, a plate;

means on said plate whereby said plate may be secured to a tire changing stand;

a plurality of at least four groups of plural bores in said plate, the bores within each group being at differing radii with respect to a predetermined point on said plate and each bore of a group being at the same radii as a corresponding bore in at least one of the other groups, sets of said groups being located at different angular positions about said point with the angular spacing between the corresponding bores within the groups of each set being different from the angular spacing between the corresponding bores within the groups of each other set, at least some of said bores being common to two of said groups; and a plurality of at least two lugs removably received in different ones of said bores;

said bores extending through said plate and each of said lugs including a shaft section having an end for receipt in a bore, and spring detent means on each said shaft section for releasably retaining each lug in a bore.

3. An adaptor for use with tire changing machines, comprising, a plate;

means on said plate whereby said plate may be secured to a tire changing stand;

a plurality of at least four groups of plural bores in said plate, the bores within each group being at differing radii with respect to a predetermined point on said plate and each bore of a group being at the same radii as a corresponding bore in at least one of the other groups, sets of said groups being located at different angular positions about said point with the angular spacing between the corresponding bores within the groups of each set being different from the angular spacing between the corresponding bores within the groups of each other set, at least some of said bores being common to two of said groups; and a plurality of at least two lugs removably received in different ones of said bores;

each group of bores including four bores, the angular spacing between the corresponding bores within the groups of one of said sets being equal to 180° and the angular spacing between the corresponding bores within the groups of another of said sets being equal to 144°.

4. The adaptor of claim 3 including a further group of said bores, the bores of said further group being angularly spaced from corresponding bores within one group of said another set by 72°; and wherein said securing means comprises an aperture extending through said plate and encompassing said point.

5. The adaptor of claim 1 further including indicia means on said plate identifying corresponding bores in the groups of each pair.

* * * * *